S. HART.
ADJUSTABLE AND REVERSIBLE PROPELLER.
APPLICATION FILED FEB. 25, 1921.
1,403,775.
Patented Jan. 17, 1922.
2 SHEETS—SHEET 1.
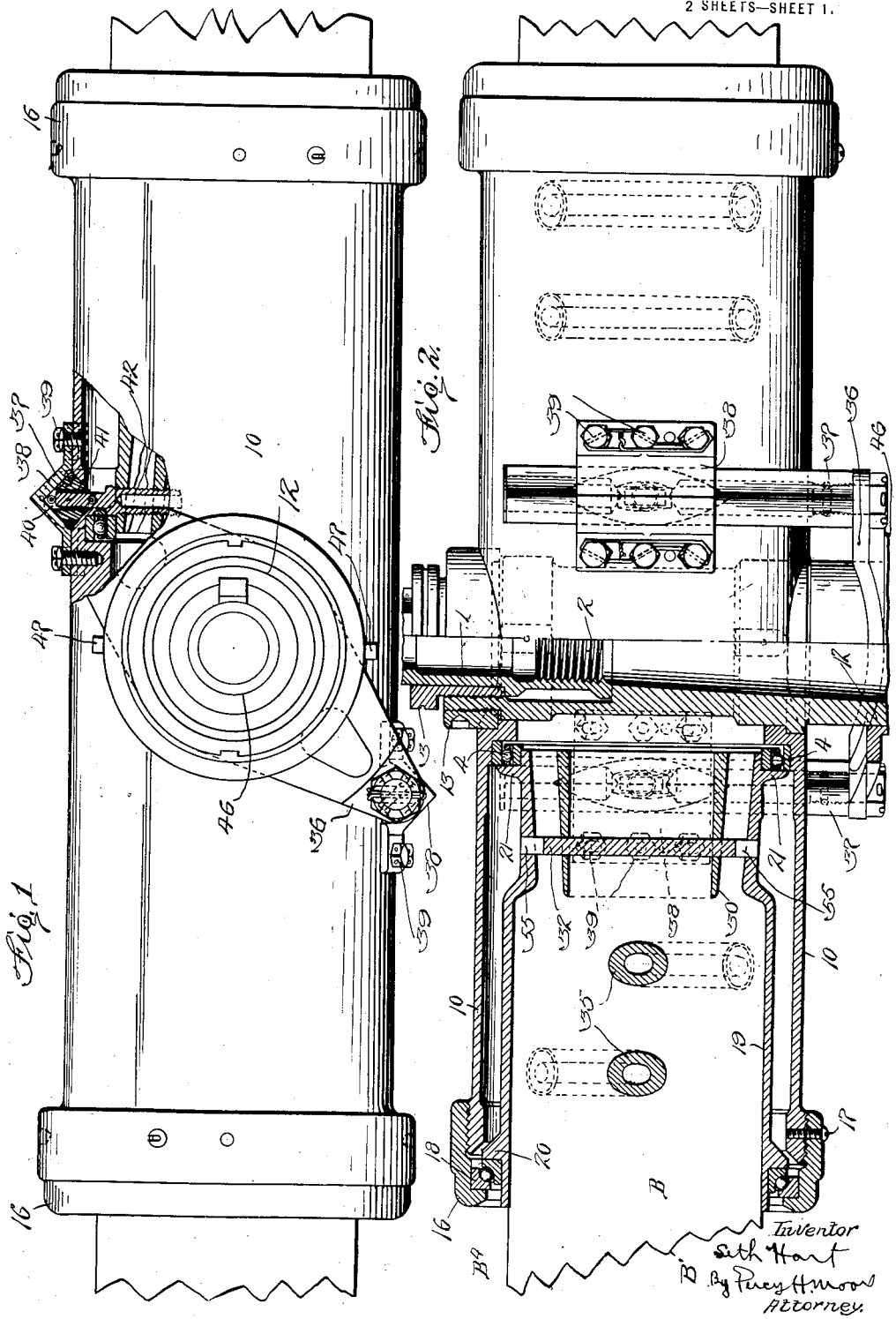

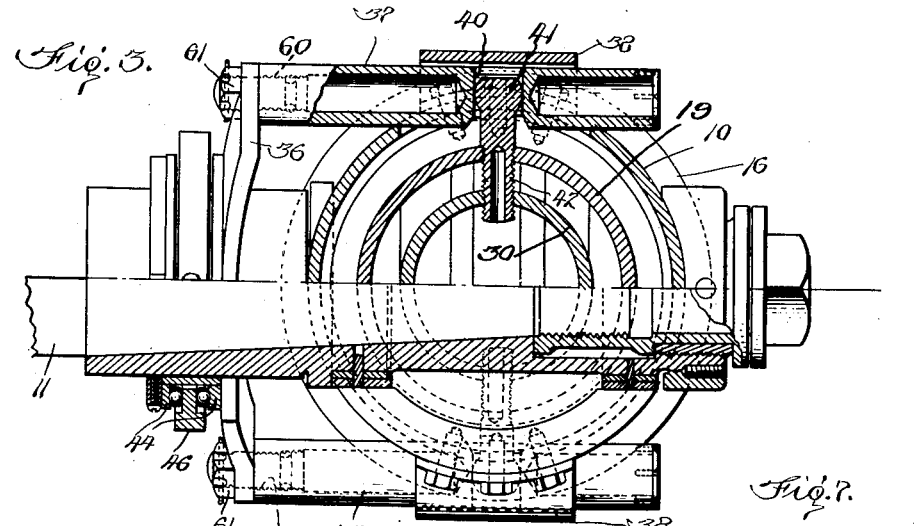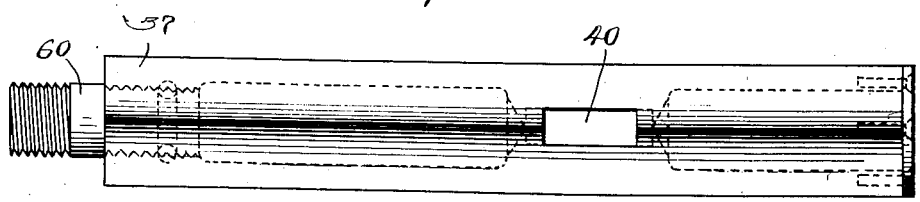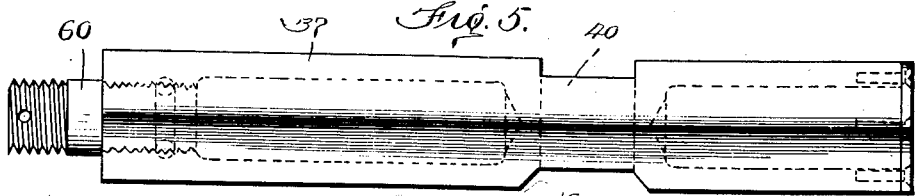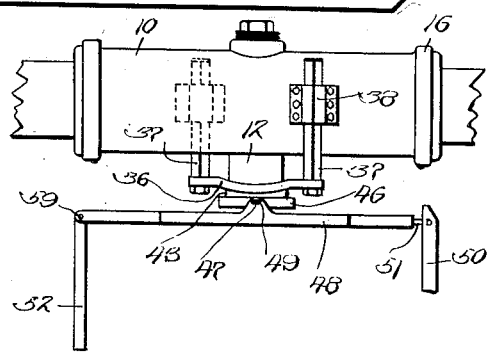

UNITED STATES PATENT OFFICE.

SETH HART, OF LOS ANGELES, CALIFORNIA, ASSIGNOR TO ADJUSTABLE & REVERSIBLE PROPELLER CORPORATION, OF LOS ANGELES, CALIFORNIA.

ADJUSTABLE AND REVERSIBLE PROPELLER.

1,403,775. Specification of Letters Patent. Patented Jan. 17, 1922.

Application filed February 25, 1921. Serial No. 447,784.

*To all whom it may concern:*

Be it known that I, SETH HART, a citizen of the United States of America, residing at Los Angeles, in the county of Los Angeles and State of California, have invented certain new and useful Improvements in Adjustable and Reversible Propellers, of which the following is a specification.

My invention relates to adjustable and reversible propellers more particularly for use on air craft.

The principal object of my invention is to provide a simple form of control for the propeller blades which is capable of a wide range of adjustment whereby the angle of the propeller blades may be reversed.

Other and further objects of the invention will be in part described and in part obvious as the specification is proceeded with.

In the accompanying drawings forming a part of this specification:

Figure 1 is a rear elevation of the invention partly in section;

Figure 2 is a side elevation thereof partly in section;

Figure 3 is an end view partly in section;

Figures 4 and 5 are detail views of the sliding arms;

Figure 6 is a detail view of the blade control or operating mechanism; and

Figure 7 is a detail view of the slider member.

Referring more particularly to the drawings wherein like reference numerals relate to corresponding parts throughout the several views, 10 denotes a tubular member which may be termed the hub member of the propeller. The hub member is mounted on the engine propeller shaft 11, by means of a shaft plug or bushing 12, interiorly bored to conform to the size of the propeller shaft, and of an exterior configuration to fit the hub member, the said plug being held to the hub by lock-nut 13. The hub member 10, bushing 12 and engine shaft 11 are drawn into place and held firmly together in the following manner. A retainer nut 1 interiorly threaded, as at 2, screws on to the end of the engine shaft 11, and is locked in place by a lock nut 3 screwing into the bushing.

The hub member 10 is substantially cylindrical in form and carries at each end an end-thrust collar 16 screw threaded upon member 10 and held against unscrewing by any suitable means, such as a screw or screws, as illustrated at 17. The collar 16 houses an end-thrust ball bearing 18, and the base ferrule 19 of the propeller blade has a collar or flange 20 thrusting against the end thrust bearing 18. The blade base B' is made cylindrical for a short distance outside the end of the hub member, at B⁴, so that collar 16 may be lifted far enough to permit of easy access to the end thrust bearing 18. The ferrule 19 is formed at its inner end with a collar or radial bearing surface at 21, engaging a radial bearing 4 in the hub member.

While I have shown and described a two-bladed propeller it will of course be understood that the invention may be applied to any suitable number of blades.

The manner of mounting the blades B in the ferrules 19 is more fully set forth in Patents 1,301,052 and 1,366,074 granted jointly to myself and R. I. Eustis but may be briefly described as follows: After the base B' of the blade B has been inserted in the ferrules under high pressure, the annular wedge 30 is driven into the end of the blade base, causing the latter to expand and tightly fit the inner tapered part of the ferrule. A small dowel pin 32 is then set through the wood blade base and wedge and into, but, preferably not through the ferrule walls, the ferrule being provided with oppositely disposed openings 55 to facilitate insertion of the dowels. A suitable number of dowel pins 35 are then put through the blade base 19, as more fully described in said prior patents.

Slidably mounted on the shaft plug or bushing 12 is a yoke 36 to which are bolted a pair of arms 37 by means of studs 60 and nuts 61, these arms in turn sliding through guides 38 bolted to the hub 10 as at 39. These arms are slotted as at 40 to snugly receive the flattened cylindrical heads 41 of a pair of pins 42 which are screwed into the base B' of the propeller blades B as best illustrated in Figure 3. Longitudinal movement of the yoke 36 causes the tilting movement of the blades in the manner hereinafter described.

The yoke 36 is formed with an extended sleeve portion 43 to which is fixed the inner races or rings 44 of a ball bearing, the outer race or ring 46 of which is provided with oppositely projecting pins 47 for a purpose about to be described.

An operating yoke member 48 preferably of elliptical shape is formed with oppositely disposed elongated apertures 49 adapted to loosely receive the pins 47. This yoke is pivoted at one end to any conveniently located fixed bracket 50 by means of a pin 51 on the yoke, and the other end of the yoke member 48 is pivotally connected at 59 to an operating rod 52 leading to the cockpit. Movement of the rod 52 in either direction is communicated to the propeller blades through the mechanism just described in an obvious manner but this operation may be briefly stated as follows: Forward or rearward movement of the rod 52 causes the flattened heads 41 of the pins 42 to rock, and slide in and out of the slots 40 and causes a consequent turning of the blades.

What I claim is:

1. In combination, a propeller shaft and a hub member having a blade receiving socket said hub member formed with an arcuate slot, a propeller blade having a base revolubly fitting in the socket, a pin fixed to said blade base and having a head projecting through said arcuate slot, a slider member revolving with said shaft and movable longitudinally thereof, a guide on said hub, an arm fixed at one end to said slider member and slidable in said guide, said arm having a slot to receive the head of said pin, and means operable from the cockpit for actuating said slider member.

2. In combination, a propeller shaft and hub member having a blade receiving socket, said hub member formed with an arcuate slot, a propeller blade having a base revolubly fitting in the socket, said blade base having a fixed projection extending through said arcuate slot, a slider member revolving with the shaft and movable longitudinally thereof, an arm fixed at one end to said slider, having a rocking, sliding connection with said projection, and means operable from the cockpit for actuating said slider member.

In testimony whereof I affix my signature.

SETH HART.